(12) United States Patent
Gupta et al.

(10) Patent No.: US 8,332,852 B2
(45) Date of Patent: Dec. 11, 2012

(54) THREAD-TO-PROCESSOR ASSIGNMENT BASED ON AFFINITY IDENTIFIERS

(75) Inventors: Manish Gupta, Yorktown Heights, NY (US); Anithra P Janakiraman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1177 days.

(21) Appl. No.: 12/176,796

(22) Filed: Jul. 21, 2008

(65) Prior Publication Data

US 2010/0017804 A1 Jan. 21, 2010

(51) Int. Cl.
*G06F 9/46* (2006.01)

(52) U.S. Cl. ........ 718/102; 718/100; 718/103; 718/104; 718/106

(58) Field of Classification Search .................. None
See application file for complete search history.

(56) References Cited

U.S. PATENT DOCUMENTS

| 6,289,369 | B1 * | 9/2001 | Sundaresan | 718/103 |
|---|---|---|---|---|
| 6,938,252 | B2 * | 8/2005 | Baylor et al. | 718/102 |
| 7,275,249 | B1 * | 9/2007 | Miller et al. | 718/105 |
| 8,051,418 | B1 * | 11/2011 | Dice | 718/102 |
| 2003/0018691 | A1 * | 1/2003 | Bono | 709/106 |
| 2004/0019891 | A1 * | 1/2004 | Koenen | 718/102 |
| 2004/0068730 | A1 * | 4/2004 | Miller et al. | 718/106 |
| 2005/0246461 | A1 * | 11/2005 | Accapadi et al. | 710/200 |
| 2006/0123423 | A1 * | 6/2006 | Brenner | 718/105 |
| 2007/0039002 | A1 * | 2/2007 | McDonald | 718/102 |
| 2007/0061805 | A1 * | 3/2007 | Brenner | 718/100 |
| 2009/0007120 | A1 * | 1/2009 | Fenger et al. | 718/102 |

OTHER PUBLICATIONS

[Beowolf] Xgrid and Mosix, www.mirrorservice.org/sites/www.beowulf.org/archives/2005-January/011512.html, Jan. 1, 2005.
"WLM: Resource affinity scheduling," IBM document OS/390 R4, Aug. 22, 1997.
"CPUSETS for Linux," www.bullopensource.org/cupset/, Oct. 11, 2004.

* cited by examiner

*Primary Examiner* — Emerson Puente
*Assistant Examiner* — Charles Swift
(74) *Attorney, Agent, or Firm* — David Mims

(57) ABSTRACT

For each thread of a computer program to be executed on a multiple-processor computer system, an affinity identifier is associated to the thread by the computer program. The affinity identifiers of the threads denote how closely related the threads are. For each thread, a processor of the multiple-processor computer system on which the thread is to be executed is selected based on the affinity identifiers of the threads, by an operating system being executed on the multiple-processor computer system and in relation to which the computer programs are to be executed. Each thread is then executed by the processor selected for the thread.

18 Claims, 3 Drawing Sheets

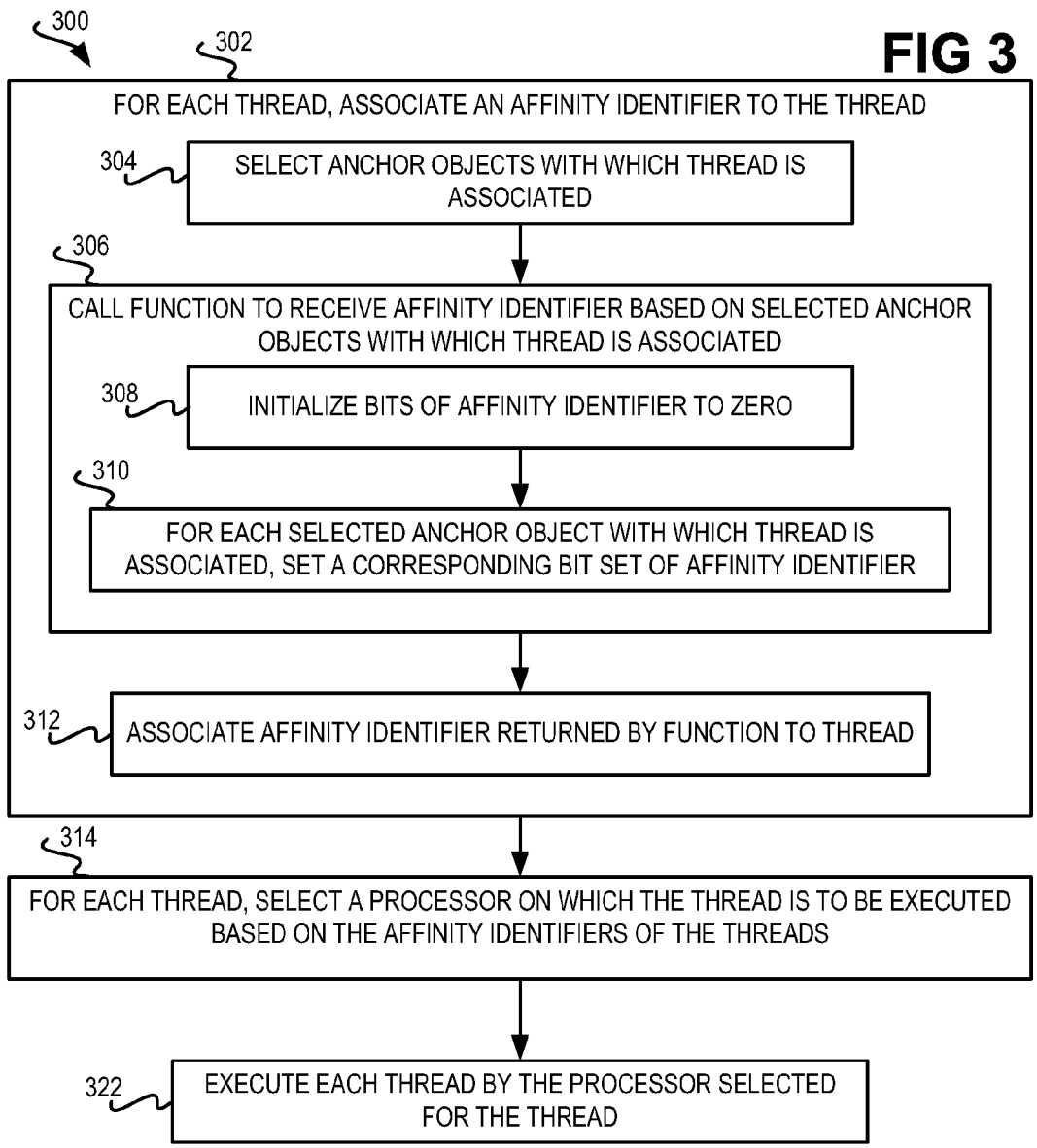

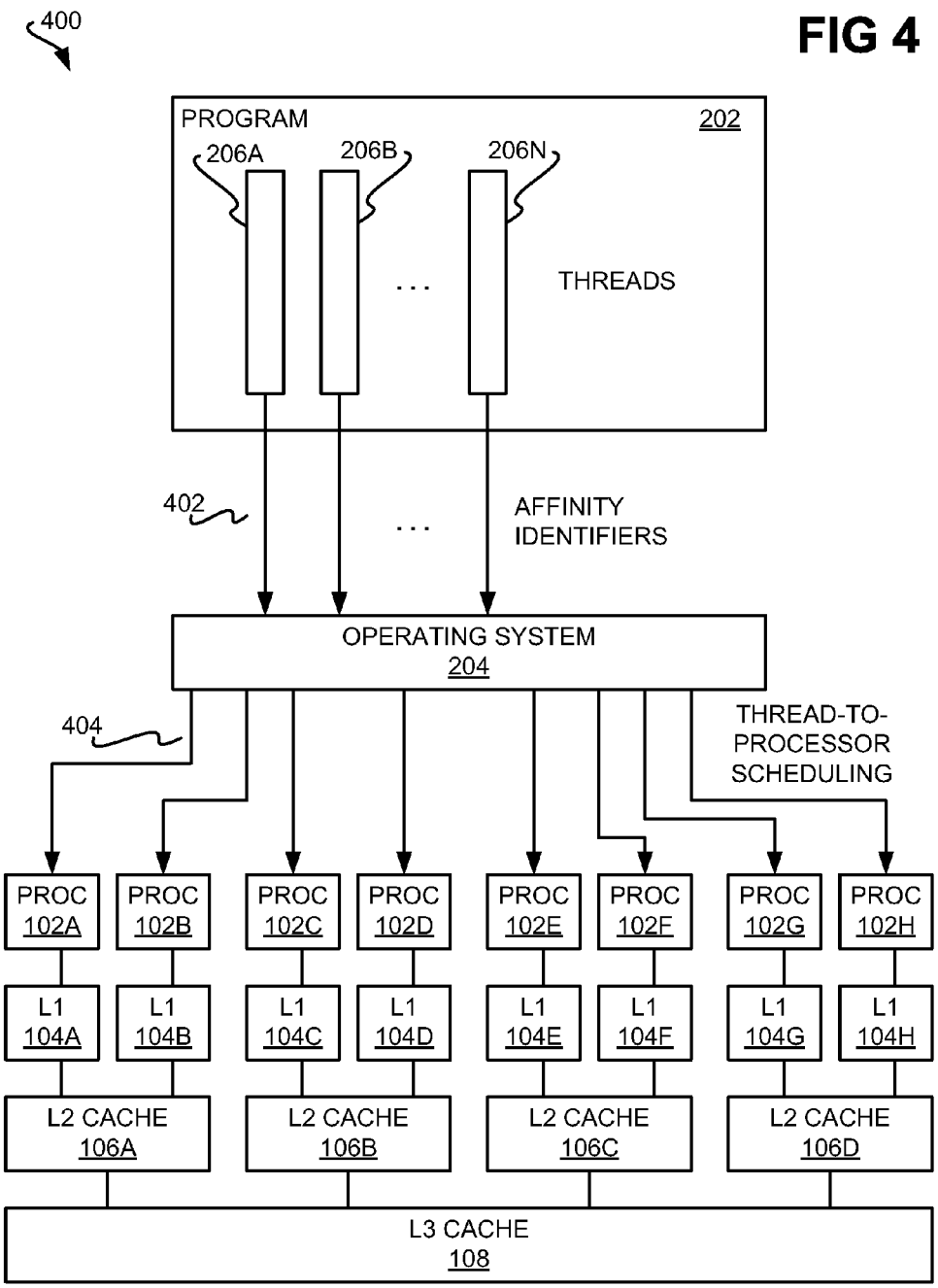

US 8,332,852 B2

THREAD-TO-PROCESSOR ASSIGNMENT BASED ON AFFINITY IDENTIFIERS

FIELD OF THE INVENTION

The present invention relates generally to assigning each of a number of threads of a computer program to a processor of a multiple-processor computer system, and more specifically to performing such thread-to-processor assignment based on affinity identifiers of the threads. The affinity identifiers denote how closely related the threads are.

BACKGROUND OF THE INVENTION

Processor integrated circuit (IC) manufacturers have shifted from increasing processor clock frequency to increase performance to instead increasing the number of processors within a given IC or chip to increase performance. Currently chips are available that have four or eight processor "cores." It is expected that in the future chips will become available that have tens of processor cores, if not hundreds or thousands of processor cores, to increase performance.

Multiple-core processor chips are advantageously employed by computer programs that have multiple threads. Generally and non-restrictively, a multiple threaded-computer program means that multitasking occurs within the program. Multithreading allows multiple streams of execution to take place concurrently within the same computer program. However, while multiple threads of a computer program may be able to be substantially executed independently and in parallel with one another by different cores, this is not always the case all the time. Often different threads may have to have their execution synchronized with one another. Furthermore, they may share the same data.

In the latter case, performance degradation can result where the threads are assigned to processors within the same IC or chip that do not share the same cache. When one thread updates the data within the cache of its processor, the data becomes invalidated in the cache of the processor of the other thread. Frequent such cache invalidation can adversely affect performance, causing cache coherence algorithms to have to be executed more frequently than is desirable.

To avoid this difficulty, therefore, threads that share data with one another, or that otherwise have affinity with one another, are desirably scheduled for execution on processors that share the same cache. However, existing processor scheduling techniques have disadvantages. Existing affinity-based scheduled techniques, for instance, denote affinity between a particular thread and a particular processor. The idea is that if the thread is rescheduled, some of the data that the thread previously relied upon may still be in the cache for the processor, such that the thread should be scheduled for the same processor as before. However, such affinity-based scheduling does not take into account that two threads may have affinity with one another, in addition to (or in lieu of) each thread having affinity with a given processor.

A technique available in the kernel of the LINUX operating system known as Cpusets permits a thread to be bound to a processor or a set of processors. Here, too, however, this technique relates to affinity between a thread and a processor, and not to affinity between two (or more) threads. The Cpusets process is also problematic because the thread-to-processor binding is controlling, prohibiting a thread from being allocated to a different processor if doing so is desirable due to other factors. The Cpusets approach further requires that the developer of a computer program have knowledge of the underlying hardware architecture on which the program is to be run in order to bind threads to processors. However, the developer may not always know this information, and the program may be desired to be run on different types of hardware architectures.

For these and other reasons, therefore, there is a need for the present invention.

SUMMARY OF THE INVENTION

The present invention provides for thread-to-processor assignment based on affinity identifiers. A method of one embodiment of the invention performs the following for each thread of a number of threads of a computer program to be executed on a multiple-processor computer system. An affinity identifier is associated with each thread, by the computer program. The affinity identifiers of the threads denote how closely related the threads are. For each thread, a processor of the multiple-processor computer system is selected on which the thread is to be executed, by an operating system, based on the affinity identifiers of the threads. The method concludes by executing each thread using the processor that has been selected for the thread.

A computer system of an embodiment of the invention includes processors, a computer program having a number of threads, and an operating system in relation to which the computer program is executed. The computer program is to associate an affinity identifier to each thread, where the affinity identifiers of the threads denote how closely related the threads are to one another. The operating system is to select for each thread one of the processors on which the thread is to be executed, based on the affinity identifiers of the threads.

A computer-readable medium of an embodiment of the invention has one or more computer programs stored thereon, which may include an operating system, for execution on a multiple-processor system. The computer-readable medium may be a tangible computer-readable medium, such as a recordable data storage medium. The computer programs implement a method. For each thread of a number of threads of a target computer program to be executed on the multiple-processor system, where the target computer program may be one of the programs stored on the medium, an affinity identifier is associated with the thread. As before, the affinity identifiers of the threads denote how closely related the threads are. For each thread, a processor of the multiple-processor computer system on which the thread is to be executed is selected based on the affinity identifiers of the threads.

In one embodiment, each thread is associated with one or more selected anchor objects of a number of anchor objects of the computer program. Each anchor object corresponds to a different set of bits (i.e., bit set) within the affinity identifier. The anchor objects are ordered from a most-significant object to a least-significant object, where the most-significant object corresponds to the most-significant bit-set within the affinity identifier and the least-significant object corresponds to the least-significant bit-set within the affinity identifier. Associating the affinity identifier to a thread includes initializing the bits of its affinity identifier to zero, and for each selected anchor object with which the thread is associated, setting the corresponding bit-set of the affinity identifier to a unique identifier of that anchor object. The difference operation between affinity identifiers of two threads is performed by comparing the bit-sets for each anchor object position, and replacing the bit-set with all 0's if the two bit-sets are identical and with all 1's if the two bit-sets are not identical. In this way, a lower difference value between the affinity identifiers of any two threads corresponds to a greater affinity between these two threads, and likewise a higher difference value between their affinity identifiers corresponds to lesser infinity between them.

Embodiments of the present invention provide for advantages over the prior art. Unlike the thread-to-processor affinity-based processor scheduling within the prior art, embodiments of the invention provide for inter-thread affinity-based processor scheduling. For instance, where two threads have high affinity, such as they are likely to share the same data, then they may be scheduled on processors that share the same cache, to reduce the likelihood of cache misses. However, in at least some embodiments, the affinity identifiers just influence, and do not completely control, which threads are assigned to which processors, so that other factors, like load-balancing, can be taken into account when scheduling threads to processors.

Furthermore, in at least some embodiments the computer program in question just signals to the underlying operating system the affinities among the various threads of the program. As such, it is the operating system, and not the computer program spawning the threads, that actually assigns the threads to the processors. This means that the developer of the computer program does not have to be aware of or otherwise have knowledge of the hardware environment in which the computer program and the operating system are running, while still being able to take advantage of affinity-based scheduling. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 3 is a flowchart for thread-to-processor scheduling taking into account inter-thread affinities, according to an embodiment of the invention.

FIG. 4 is a diagram of a system, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Representative Multiple-Processor Computer System and Software Environment

Figure 1:
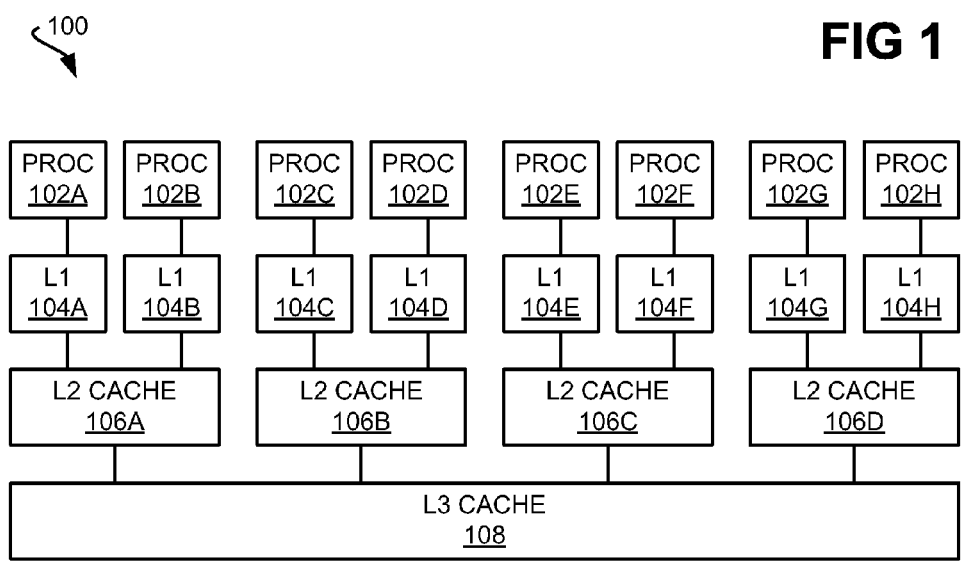
FIG. 1 is a diagram of a multiple-processor computer system, in relation to which embodiments of the invention can be implemented and performed.

FIG. 1 shows a representative multiple-processor computer system 100, in relation to which embodiments of the invention can be implemented and can be performed. The system 100 may be implemented as a single chip, or integrated circuit (IC), in one embodiment. The system 100 in FIG. 1 includes eight processors 102A, 102B, 102C, 102E, 102E, 102F, 102G, and 102H, collectively referred to as the processors 102. However, in other embodiments the system 100 may have fewer than eight processors 102 or more than eight processors 102.

The processors 102 have corresponding level-one (L1) caches 104A, 104B, 104C, 104D, 104E, 104F, 104G, and 104H, collectively referred to as the L1 caches 104. Each L1 cache is specific to a corresponding processor. Thus, the L1 cache 104A is for the processor 102A and not shared with any other processor, the L1 cache 104B is for the processor 102B and not shared with any other processor, and so on.

Different pairs of the processor 102, however, share each of the level-two (L2) caches 106A, 106B, 106C, and 106D, collectively referred to as the L2 caches 106. For instance, the processors 102A and 102B share the L2 cache 106A, the processors 102C and 102D share the L2 cache 106B, and so on. Except for the two processors sharing a given L2 cache, no other processor shares this same L2 cache. Finally, all of the processors 102 share a level-three (L3) cache 108.

Those of ordinary skill within the art can appreciate that variations to the architecture of the multiple-processor computer system 100 are encompassed by embodiments of the invention. For instance, there may be no L3 cache 108 and/or no L1 caches 104. As another example, more than two processors may share each of the L2 caches 106, and/or a given processor may have access to more than one of the L2 caches 106, in contradistinction to what is depicted in FIG. 1. The caches 104, 106, and 108 may further be memory in addition to and/or other than cache memory.

Figure 2:
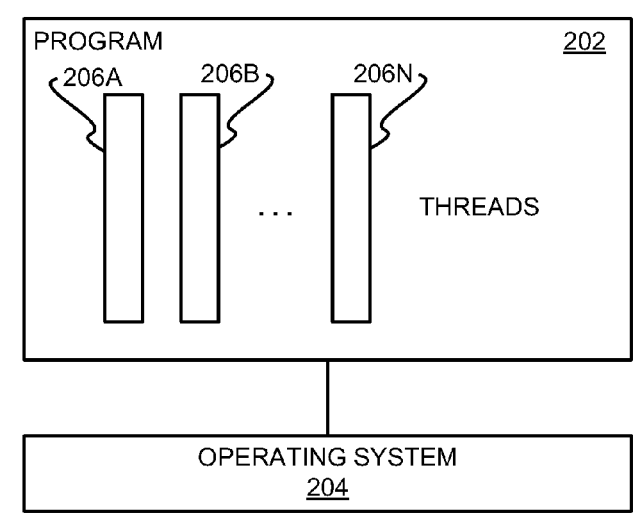
FIG. 2 is a diagram of a software environment, in relation to which embodiments of the invention can be implemented and performed.

FIG. 2 shows a software environment 200 that can be executed by the multiple-processor computer system 100 of FIG. 1, and thus in relation to which embodiments of the invention can be implemented and/or be performed. The software environment 200 includes an application computer program 202 that runs on an operating system 204. The application computer program 202 is a multiple-threaded computer program having threads 206A, 206B, . . . , 206L, collectively referred to as the threads 206. The operating system 204 is an operating system that is capable of supporting multiple such threads. It is noted that the operating system 204 is also a computer program, although those of ordinary skill within the art can appreciate that the operating system 204 is a special type of computer program as compared to the application computer program 202. The computer program 202 is executed in relation to the operating system 204, as can also be appreciated by those of ordinary skill within the art.

As has been noted in the background section, generally and non-restrictively, a multiple-threaded computer program means that multitasking occurs within the program. Multithreading allows multiple streams of execution to take place concurrently within the same computer program. For instance, each of the threads 206 of the application program 202 may be executed by a different processor of the multiple-processor computer system 100 of FIG. 1.

In general, threads have affinity with one another when they are closely related to one another. For example, such threads may utilize the same data. Therefore, embodiments of the present invention provide for processor scheduling (i.e., the allocation of a thread to a processor for execution) of such threads to take into account the affinity between the threads. For instance, if two threads have affinity with one another, in the context of the multiple-processor computer system 100, it is more desirable for the threads to be scheduled on two processors that share the same L2 cache than to be scheduled on two processors that do not share the same L2 cache. Such affinity-based reduces cache misses at the L2 cache level, and thus improves performance. What is described in the next section of the detailed description is a particular approach by which such affinity-based processor scheduling can be achieved.

Detailed Method

FIG. 3 shows a method 300 for inter-thread affinity-based processor scheduling, according to an embodiment of the present invention. The method 300 can be performed in relation to the processors 102 of the multiple-processor computer system 100 of FIG. 1. The method 300 can also or alternatively be performed in relation to the application computer program 202 and the operating system 204 of FIG. 2.

For each thread of the threads of a computer program, an affinity identifier is associated to the thread (302). The affinity identifiers of the threads denote how closely related the threads are to one another, as opposed to, for instance, the affinity of a thread to a processor as in the prior art. Such affinity of the threads to one another can indicate to what extent the threads are likely to share data with one another, in one embodiment of the invention.

For example, if the affinity identifier corresponds to four anchor objects with three bit-sets for each object, four threads A, B, C, and D may have the following affinity identifiers: b 0x010000001, 0x010000100, 0x000100001, and 010000001 respectively. The affinity identifiers for threads A and D are identical, indicating that there is very high affinity between these two threads. The difference value of the affinity identifiers is 000000000000. The affinity identifiers for threads A and B have a difference of 000000000111 as they differ only on the third anchor object, indicating that there is some affinity between these two threads, but not as much as between threads A and D. The same is true for threads B and D. By comparison, thread C has an affinity identifier that is significantly different than the affinity identifier for thread A, B, or D. The difference between threads A and C is 111111111000, which is relatively higher than the difference between A and D and corresponds to threads A and C having lesser affinity.

Therefore, the affinity identifiers in one embodiment can include a series of bits, ordered from a most-significant (left-most) bit to a least-significant (right-most) bit. The lower the difference value between the affinity identifiers of any two threads corresponds to greater affinity between these two threads. Likewise, the higher the difference value between the affinity identifiers of any two threads corresponds to lower affinity between these two threads.

In one embodiment, associating an affinity identifier to a thread is achieved as follows. First, a number of anchor objects with which the thread in question is associated are selected (304). A computer program may have a number of objects, such as object-oriented programming (OOP) as known to those of ordinary skill within the art. The developer of the computer program may denote that at least some of these objects are significant objects, in that they are used extensively by the computer program. Even if the object is not used extensively, however the threads sharing these objects in likelihood share other objects. Such important objects are referred to as anchor objects herein. For example, the process identifier (PID) can be an anchor object if it is desired to denote that all threads of the process have high affinity.

For the set of anchor objects, then, a thread may be associated with a subset of the anchor objects—as few as one anchor object, and as many as all the anchor objects. The association of a thread to one or more of the anchor objects can be achieved in a number of different ways, in accordance with a number of different criteria. The developer may pre-program the computer program so that certain threads created or spawned by the program are automatically associated with certain objects. Alternatively, a component of the computer program stack—for instance, a Java virtual machine runtime—may itself make this association. For example, in the Java programming language, many instances of a class called objects are created. Different threads may access different object instances. Therefore, a given thread is associated with those anchor objects that it accesses. The association of a thread to an anchor object is achieved when the thread accesses the object for read or write.

Once each thread has been associated with selected anchor objects, in one embodiment the computer program may call a component of the computer program stack, or an operating system function, to receive an affinity identifier for a thread based on the selected anchor objects with which the thread is associated (306). The function performs parts 308 and 310. Alternatively, the computer program itself may perform parts 308 and 310 to specify the affinity identifier for a thread based on the selected anchor objects with which the thread is associated.

In either case, the bits of the affinity identifier are initialized to zero (308). Each anchor object of the complete set of anchor objects corresponds to a different bit-set of the affinity identifier. The anchor objects are further ordered from a most-significant anchor object to a least-significant anchor object, such that the most-significant anchor object corresponds to the most-significant bit-set of the affinity identifier and the least-significant anchor object corresponds to the least-significant bit-set of the affinity identifier.

The significance of an anchor object is in terms of how much the anchor object affects the affinity of a thread to another thread. For example, if an anchor object is heavily accessed by two or more threads, it may be considered a significant anchor object because the threads that access the anchor object have high affinity with one another. It is also possible that even if the anchor object is not accessed extensively, the threads sharing this object in likelihood share other objects. Such threads will have a high affinity with one another and the anchor object can considered a significant anchor object in this way.

Next, for each selected anchor object with which a thread is associated, a corresponding bit-set of the affinity identifier for the thread is set (310). For example, assume that there are two anchor objects A and B, where object A is the most significant in terms of inter-thread affinity. The affinity identifier can then be determined by the process identifier (PID) and the two anchor objects A and B. In part 308, then, the affinity identifier for this thread is initially set to 0x000000000000. In part 310, each anchor object is associated with 4 bits. If the bit-set associated with object B is 0100 then a thread that accesses B and belongs to the process with PID 1100 would have the affinity identifier 0x110000000100. In one embodiment, the integer value of the internal address of the object can be used to determine the bit-set of the object. In part 310, the bit-set size can be determined by the memory address size of the processor. If the address of the anchor object is 0x01001100, for instance, then in part 310 this address would be the bit-set associated with anchor object B and the bit-set size would be eight.

The affinity identifier returned by the function (or as determined by the computer program itself) is then associated to the thread by the computer program (312). The computer program's involvement with thread-to-processor scheduling is thus finished. Once the computer program has determined the affinity identifiers for its threads, and has passed these affinity identifiers to the operating system, it does not have to perform any further functionality. This means, therefore, that the computer program does not have to have knowledge of the underlying hardware architecture (i.e., how many processors there are in the multiple-processor system, which caches these processors share, and so on) for the inventive affinity-based scheduling to be performed.

Next, the operating system, for each thread, selects a processor on which the thread is to be executed, based on the affinity identifiers of the threads (314). It is noted that the affinity identifiers in one embodiment do not control the processor selection process in one embodiment, but rather just influences this process. Therefore, if other factors, such as load-balancing needs, militate against thread-to-processor assignment as suggested by the affinity identifiers, then the operating system can in this embodiment ignore the affinity identifiers.

In general, the idea is to assign threads that have high affinity with one another to processors that share the same cache (or to the same processor). Stated another way, for each thread, a processor on which the thread is to be executed is selected to increase the likelihood that any two threads having a lower difference value between their affinity identifiers are assigned processors sharing the same cache (or are assigned to the same processor). This same cache may be the same L2 cache in one embodiment of the invention.

For example, as noted above, there may be four threads A, B, C, and D may have the following affinity identifiers: 0x010000001, 0x010000100, 0x000100001, and 0x010000001, respectively. Thus, threads A and D most desirably are assigned processors sharing the same (L2) cache (or are assigned the same processor), because the difference value between their affinity identifiers is zero. Threads A and B and B and D have a slightly greater difference values between their affinity identifiers—viz., sixty-three—and therefore it is also desirable to assign these threads to processors that share the same (L2) cache (or are assigned the same processor) if possible. By comparison, it is relatively unimportant to assign thread C the same processor or a processor that shares a cache with the processor of either thread A, B, or D, because the difference value between the affinity identifier for thread C and the affinity identifier for thread A, B, or D is quite high.

Once a processor has been selected for each thread, the threads are executed by their selected processors (322). As such, assuming no other constraints exist that cause processors to be selected for threads on bases other than their affinity identifiers, such inter-thread affinity-based thread-to-processor scheduling is advantageous. Threads having affinity with one another are desirably assigned to the same processor, or to different processors that share the same cache. While the computer program creating the threads determines the affinity identifiers for threads in part 302, it does not have to have any knowledge of the underlying hardware architecture, since it is the operating system that performs the selection process in part 314.

Representative System and Conclusion

In conclusion, FIG. 4 shows a rudimentary system 400, according to an embodiment of the present invention. The system 400 incorporates the system 100 of FIG. 1 that has been described, as well as the software environment 200 of FIG. 2 that has been described. Thus, the system 400 includes at least the processors 102, the computer program 202 having the threads 206, and the operating system 204. The system 404 may also include the L1 caches 104, the L2 caches 106, and/or the L3 cache 108 as are depicted in FIG. 4.

The computer program 202 associates an affinity identifier with each of the threads 206, and sends the affinity identifiers for the threads 206 to the operating system 204, as indicated by the reference number 402. This can be achieved by the computer program 202 performing part 302 of the method 300 of FIG. 3 as has been described. The operating system 204 then schedules which of the threads 206 are to be executed on which of the processors 102, as indicated by the reference number 404. This can be achieved by the operating system 204 performing part 314 of the method 300 as has been described. Thereafter, the processors 102 execute the threads 206 that have been assigned to them, as has been described in relation to part 322 of the method 300.

It is further and finally noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

We claim:

1. A method comprising:
   for each thread of a plurality of threads of a computer program to be executed on a multiple-processor computer system, associating an affinity identifier to the thread by the computer program, the affinity identifiers of the threads denoting how closely related the threads are;
   for each thread, selecting a processor of the multiple-processor computer system on which the thread is to be executed based on but not dictated by the affinity identifiers of the threads such that one or more other parameters also influence selection of the processor on which the thread is to be executed, by an operating system being executed on the multiple-processor computer system and in relation to which the computer program is to be executed; and,
   for each thread, executing the thread by the processor selected for the thread,
   wherein the threads comprise a first thread and a second thread having affinity with one another, where a first processor is selected on which the first thread is to be executed and a second processor is selected on which the second thread is to be executed, and where the first processor is a different processor than the second processor,
   wherein each thread is associated with one or more selected anchor objects of a plurality of anchor objects of the computer program, each anchor object corresponding to a different bit-sit within the affinity identifier,
   wherein the plurality of anchor objects are ordered from a most-significant anchor object to a least-significant anchor object, the most-significant anchor object corresponding to a most-significant bit-set within the affinity identifier and the least-significant anchor object corresponding to a least-significant bit-set within the affinity identifier,
   such that a lower difference value between the affinity identifiers of any two threads corresponds to greater affinity between the two threads and a higher difference value between the affinity identifiers of any two threads corresponds to lesser affinity between the two threads.

2. The method of claim 1, wherein associating the affinity identifier to the thread comprises:
setting a plurality of bits of the affinity identifier to zero; and,
for each selected anchor object with which the thread is associated, setting corresponding bits of the affinity identifier.

3. The method of claim 1, wherein the difference value between the affinity identifiers of any two threads is determined by comparing bit-sets for the anchor objects corresponding to the two threads, and replacing the bit-sets with all 0's where the bit-sets are identical and with all one's where the two bit-sets are not identical.

4. The method of claim 1, wherein, for each thread, selecting the processor on which the thread is to be executed based on the affinity identifiers of the threads comprises increasing a likelihood that any two threads having a lower difference value between the affinity identifiers of the two threads are assigned to two processors of the multiple-processor computer system that share a same cache.

5. The method of claim 2, further comprising, for each thread, choosing the selected anchor objects for the thread from the plurality of anchor objects, by the computer program.

6. The method of claim 4, wherein the selected anchor objects are chosen from the plurality of anchor objects for each thread by one of choosing the anchor objects of which the thread is likely to access and choosing the anchor objects such that access of the anchor objects implies access of other objects.

7. The method of claim 4, wherein one of:
a process identifier is employed as the affinity identifier; and,
the process identifier is employed as one of a set of anchor objects to determine the affinity identifier.

8. The method of claim 4, wherein an internal address of the anchor object is employed as a bit-set identifier of the anchor object within the affinity identifier.

9. The method of claim 1, wherein associating the affinity identifier to the thread comprises:
calling a function to receive an affinity identifier, based on identification of the selected anchor objects with which the thread is associated as passed to the function; and,
associating the affinity identifier returned from the function to the thread.

10. The method of claim 6, wherein the function initializes the affinity identifier to zero, and for each selected anchor object with which the thread is associated sets a corresponding bit-set of the affinity identifier.

11. The method of claim 1, wherein, for each thread, selecting the processor on which the thread is to be executed based on the affinity identifiers of the threads using the affinity identifiers of the threads to influence, but not completely control, the processor selected for each thread.

12. A computer system comprising:
a plurality of processors;
a computer program having a plurality of threads, the computer program to associate an affinity identifier to each thread, the affinity identifiers of the threads denoting how closely related the threads are; and,
an operating system in relation to which the computer program is executed, the operating system to select for each thread one of the processors on which the thread is to be executed based on but not dictated by the affinity identifiers of the threads such that one or more other parameters also influence selection of the one of the processors on which the thread is to be executed,
wherein the threads comprise a first thread and a second thread having affinity with one another, where a first processor is selected on which the first thread is to be executed and a second processor is selected on which the second thread is to be executed, and where the first processor is a different processor than the second processor,
wherein each thread is associated with one or more selected anchor objects of a plurality of anchor objects of the computer program, each anchor object corresponding to a different bit-sit within the affinity identifier,
wherein the plurality of anchor objects are ordered from a most-significant anchor object to a least-significant anchor object, the most-significant anchor object corresponding to a most-significant bit-set within the affinity identifier and the least-significant anchor object corresponding to a least-significant bit-set within the affinity identifier,
such that a lower difference value between the affinity identifiers of any two threads corresponds to greater affinity between the two threads and a higher difference value between the affinity identifiers of any two threads corresponds to lesser affinity between the two threads.

13. The computer system of claim 12, wherein the computer program is to initialize the affinity identifier for each thread to zero and is to set each bit-set based on the selected anchor objects with which the thread is associated.

14. The computer system of claim 13, wherein the computer program is further to choose the selected anchor objects for each thread from the plurality of anchor objects.

15. The computer system of claim 14, wherein the computer program is to choose the selected anchor objects for each thread as the anchor objects of which the thread is likely to access.

16. The computer system of claim 12, wherein the computer program is to call a function to receive an affinity identifier to associate with each thread based on identification of the selected anchor objects with which the thread is associated as passed to the function.

17. The computer system of claim 12, wherein the operating system is influenced by, but not controlled by, the affinity identifiers of the threads when selecting the processors on which the threads are to be executed.

18. A non-transitory computer-readable medium having one or more computer programs stored thereon for execution on a multiple-processor system to perform a method comprising:
for each thread of a plurality of threads of a target computer program to be executed on the multiple-processor system, associating an affinity identifier to the thread, the affinity identifiers of the threads denoting how closely related the threads are;
for each thread, selecting a processor of the multiple-processor computer system on which the thread is to be executed based on but not dictated by the affinity identifiers of the threads such that one or more other parameters also influence selection of the processor on which the thread is to be executed, wherein each thread is associated with one or more selected anchor objects of a plurality of anchor objects of the computer program, each anchor object corresponding to a different bit-set within the affinity identifier, wherein associating the affinity identifier to the thread comprises initializing the affinity identifier to zero, and for each selected anchor object with which the thread is associated setting a corresponding bit-set of the affinity identifier, and wherein the plurality of anchor objects are ordered from a most-significant anchor object to a least-significant anchor object, the most-significant anchor object corresponding to a most-significant bit-set within the affinity identifier and the least-significant anchor object corresponding to a least-significant bit-set within the affinity identifier, such that a lower difference value between the affinity identifiers of any two threads corresponds to greater affinity between the two threads and a higher difference value between the affinity identifiers of any two threads corresponds to lesser affinity between the two threads, wherein the threads comprise a first thread and a second thread having affinity with one another, where a first processor is selected on which the first thread is to be executed and a second processor is selected on which the second thread is to be executed, and where the first processor is a different processor than the second processor.

* * * * *